United States Patent
Suzuki et al.

(10) Patent No.: US 9,422,844 B2
(45) Date of Patent: *Aug. 23, 2016

(54) EXHAUST PURIFICATION DEVICE FOR ENGINE

(75) Inventors: Yasuko Suzuki, Kawasaki (JP); Hiroaki Fujita, Kawasaki (JP); Satoshi Hiranuma, Kawasaki (JP); Shinichi Saito, Kawasaki (JP); Yoshio Nakayama, Kawasaki (JP)

(73) Assignee: MITSUBISHI FUSO TRUCK AND BUS CORPORATION, Kawasaki-shi (JP)

( * ) Notice: Subject to any disclaimer, the term of this patent is extended or adjusted under 35 U.S.C. 154(b) by 1866 days.

This patent is subject to a terminal disclaimer.

(21) Appl. No.: 12/176,315

(22) Filed: Jul. 18, 2008

(65) Prior Publication Data

US 2009/0019842 A1  Jan. 22, 2009

(30) Foreign Application Priority Data

Jul. 20, 2007 (JP) .................................. 2007-189525

(51) Int. Cl.
*F01N 13/08* (2010.01)
*F01N 3/20* (2006.01)
(Continued)

(52) U.S. Cl.
CPC ............ *F01N 3/0231* (2013.01); *B01D 53/90* (2013.01); *B01D 53/9431* (2013.01); *F01N 3/035* (2013.01); *F01N 3/0821* (2013.01); *F01N 3/2066* (2013.01); *F01N 13/009* (2014.06); *F01N 13/0093* (2014.06); *F01N 13/0097* (2014.06); *B01D 2251/2062* (2013.01);
(Continued)

(58) Field of Classification Search
USPC ............................................ 60/286, 295, 301
See application file for complete search history.

(56) References Cited

U.S. PATENT DOCUMENTS 6,449,947 B1 *  9/2002  Liu et al. ......................... 60/286
7,200,989 B2 *  4/2007  Mayer et al. ................... 60/286
(Continued)

FOREIGN PATENT DOCUMENTS

CN        1863987 A      11/2006
CN        1957161 A       5/2007
(Continued)

OTHER PUBLICATIONS

JP 08226611 A Machine Translation.*
(Continued)

*Primary Examiner* — Kenneth Bomberg
*Assistant Examiner* — Brandon Lee
(74) *Attorney, Agent, or Firm* — Rossi, Kimms & McDowell LLP

(57) ABSTRACT

An exhaust purification device for an engine comprises a catalyst device that purifies the exhaust gas of the engine by using an additive; a venturi-shaped mixing chamber that is disposed upstream from the catalyst device and extends from a taper portion with a diameter tapering downstream to continue to a constricted portion with a minimum diameter and then to a flared portion with a diameter that is increased in the downstream direction; a swirl-generating device that is disposed in vicinity of a most upstream section of the taper portion of the mixing chamber and generates a swirling flow in the exhaust gas; and an additive-injection device that is disposed upstream from the constricted portion of the mixing chamber and downstream from the swirl-generating device, and injects the additive into the mixing chamber.

4 Claims, 2 Drawing Sheets

(51) Int. Cl.
   *F01N 3/023*    (2006.01)
   *B01D 53/90*    (2006.01)
   *B01D 53/94*    (2006.01)
   *F01N 3/035*    (2006.01)
   *F01N 3/08*     (2006.01)
   *F01N 13/00*    (2010.01)
   *F02B 37/00*    (2006.01)

(52) U.S. Cl.
   CPC ........ *F01N2240/20* (2013.01); *F01N 2570/18* (2013.01); *F01N 2610/02* (2013.01); *F01N 2610/08* (2013.01); *F01N 2610/14* (2013.01); *F02B 37/00* (2013.01); *Y02T 10/24* (2013.01)

(56) References Cited

U.S. PATENT DOCUMENTS

| | | | |
|---|---|---|---|
| 7,673,444 B2* | 3/2010 | Yano et al. | 60/277 |
| 7,784,273 B2* | 8/2010 | Kanaya et al. | 60/286 |
| 7,793,491 B2* | 9/2010 | Esaka | 60/286 |
| 7,908,843 B2* | 3/2011 | Doumeki et al. | 60/286 |
| 2003/0079467 A1* | 5/2003 | Liu et al. | 60/286 |
| 2005/0039456 A1* | 2/2005 | Hayashi | 60/737 |
| 2006/0035183 A1* | 2/2006 | Carroni et al. | 431/7 |
| 2007/0000240 A1* | 1/2007 | Hirata et al. | 60/286 |
| 2007/0101703 A1 | 5/2007 | Kanaya et al. | |
| 2007/0245718 A1 | 10/2007 | Cheng et al. | |
| 2010/0031641 A1* | 2/2010 | Oda et al. | 60/286 |
| 2010/0186391 A1* | 7/2010 | Najt et al. | 60/295 |
| 2010/0192547 A1* | 8/2010 | Yabe et al. | 60/286 |
| 2010/0307140 A1* | 12/2010 | Viola et al. | 60/286 |

FOREIGN PATENT DOCUMENTS

| | | | | |
|---|---|---|---|---|
| CN | 1985080 A | | 6/2007 | |
| JP | 08226611 A | * | 9/1996 | ............. F23C 11/00 |
| JP | 2002-213233 A | | 7/2002 | |
| JP | 2002213233 A | * | 7/2002 | |
| JP | 2003-232218 A | | 8/2003 | |
| JP | 2004-324585 A | | 11/2004 | |
| JP | 2005-127271 A | | 5/2005 | |
| JP | 2005-256633 A | | 9/2005 | |
| JP | 2005-273579 A | | 10/2005 | |
| JP | 2006-029233 A | | 2/2006 | |
| JP | 2006-183509 A | | 7/2006 | |
| JP | 2007-170382 A | | 7/2007 | |
| JP | 2008-309000 A | | 12/2008 | |

OTHER PUBLICATIONS

Japanese Office Action corresponding to JP 2007-189525, dated Jul. 15, 2011.
Notice of Allowance issued in corresponding Korean Patent Application No. 9-5-2010-025648103 dated Jun. 16, 2010. Cited in related co-pending U.S. Appl. No. 12/176,311.
Notice of Allowance issued in corresponding Korean Patent Application No. 9-5-2010-025648057 dated Jun. 16, 2010.
Notice of Allowance issued in corresponding Korean Patent Application No. 9-5-2010-025648103 dated Jun. 16, 2010. Only English translation is provided; foreign-language document was previously provided with the IDS filed Aug. 3, 2010. Cited in related co-pending U.S. Appl. No. 12/176,311.
Notice of Allowance issued in corresponding Korean Patent Application No. 9-5-2010-025648057 dated Jun. 16, 2010. Only English translation is provided; foreign-language document was previously provided with the IDS filed Aug. 3, 2010.
Office Action issued in corresponding Chinese Patent Application No. 200810134711.2 dated Oct. 9, 2009. Cited in related co-pending U.S. Appl. No. 12/176,311. Only English translation is provided; foreign-language document was previously provided with the IDS filed Jan. 6, 2010.
Specification, claims, abstract and drawings of related co-pending U.S. Appl. No. 12/176,311, filed Jul. 18, 2008, pp. 1-26.
Office Action issued in corresponding Chinese Patent Application No. 2008101347112 dated Oct. 9, 2009. Cited in related co-pending U.S. Appl. No. 12/176,311.
German Office Action for corresponding DE 102008032109.5, dated May 3, 2013.

* cited by examiner

EXHAUST PURIFICATION DEVICE FOR ENGINE

This application is based on, and claims priority to, Japanese Patent Application No: 2007-189525, filed on Jul. 20, 2007. The disclosure of the priority application, in its entirety, including the drawings, claims, and the specification thereof, is incorporated herein by reference.

BACKGROUND OF THE INVENTION

1. Field of the Invention

The present invention relates to an exhaust purification device for an engine, and more specifically, to an exhaust purification device in which a swirling flow is generated in engine exhaust gas, and an additive sprayed into the exhaust gas is supplied to a catalyst device located downstream together with the exhaust gas.

2. Description of the Related Art

In respect of an exhaust purification device that uses an additive to defuse toxic substances contained in the exhaust gas and purify the exhaust gas, it is important to mix the sprayed additive well with the exhaust gas, making use of the swirling flow, and to uniformly diffuse and atomize the mixed additive in the exhaust gas. If these conditions are satisfied, the additive is substantially uniformly supplied throughout the catalyst device, and the high purification performance of the catalyst device is achieved. Various techniques have been designed in consideration of such demand. For instance, JP 2006-183509 (hereinafter, referred to as Patent Document 1) discloses an exhaust purification device that carries out the techniques.

In the exhaust purification device disclosed in Patent Document 1, a swirling flow is generated in exhaust gas by a swirl generator that is disposed in the large-diameter portion of an exhaust path. In the process where the generated swirling flow passes through a taper portion toward a small-diameter portion, the swirling flow is increased in swirling velocity by being reduced in swirl radius by degree. This promotes the mixture of the additive with the exhaust gas and advances the diffusion and atomization of the additive in the exhaust gas. In the exhaust purification device of Patent Document 1, the exhaust path includes a portion with a diameter tapering toward the small-diameter portion and a portion extending from the small-diameter portion and being increased in diameter with steps to be connected to a catalyst device located downstream. There is another exhaust purification device in which an exhaust path has a diameter that is reduced in one portion and then gradually increased in another, and is connected to a catalyst device as shown in FIG. 2.

In the example illustrated in FIG. 2, there is provided an SCR catalyst 116 (selective reduction-type NOx catalyst) for removing NOx (nitrogen oxide), which functions as a catalyst device. A venturi-shaped mixing chamber 113 formed of a taper portion 113$a$, a constricted portion 113$b$ and a flared portion 113$c$ is interposed in an exhaust pipe 110. In the process where the exhaust gas flows through the mixing chamber 113, a swirling flow that is generated by a fin device 118 is gradually increased in swirling velocity within the taper portion 113$a$ along with the decrease of the swirl radius. The swirling flow is then guided to the SCR catalyst 116 while being gradually increased in swirl radius within the flared portion 113$c$. In light of the knowledge that an additive is preferably sprayed at a position where an exhaust flow rate is high so that the additive sprayed from an injection nozzle 119 may be well mixed with exhaust gas and that the additive may be diffused and atomized uniformly in the exhaust gas, the exhaust purification device of the above-mentioned type is provided with an injection nozzle 119 that is disposed in between the taper portion 113$a$ and the flared portion 113$c$ of the mixing chamber 113, that is, in the constricted portion 113$b$ (minimum-diameter position) where the exhaust flow rate reaches its highest value.

In many cases, however, distance L' between the fin device 118 and the SCR catalyst 116 cannot be sufficiently ensured due to constraints associated with the configuration of the exhaust pipe 110 and the like. For this reason, in the exhaust purification device of Prior Art shown in FIG. 2, either one of distance Lf' between the fin device 118 and the constricted portion 113$b$ of the mixing chamber 113 or distance Ln' between the injection nozzle 119 and the SCR catalyst 116 has to be set at a smaller value than an optimum value.

In the taper portion 113$a$ of the mixing chamber 113, the mixture of the exhaust gas with the additive is facilitated by gradually reducing the swirl radius of the swirling flow generated in the exhaust gas and increasing the swirling velocity at the same time. If the distance Lf' between the fin device 118 and the constricted portion 113$b$ is shortened, the swirl radius of the swirling flow is drastically reduced, and kinetic energy is lost. Therefore, the swirling velocity cannot be adequately increased. This causes an insufficient mixture of the additive and the exhaust gas. The additive sprayed from the injection nozzle 119 is diffused and atomized in the exhaust gas while being transferred in the downstream direction. If the distance Ln' between the injection nozzle 119 and the SCR catalyst 116 is shortened, it becomes impossible to ensure sufficient time required for the diffusion and atomization of the additive. This incurs insufficient diffusion and atomization of the additive.

The exhaust purification performance of the SCR catalyst 116 is delivered to the fullest extent when the good mixture of the additive and the exhaust gas and the uniform diffusion and atomization of the additive in the exhaust gas are both accomplished. In this view, the above-mentioned Prior Art has room for improvement in terms of exhaust purification performance of the SCR catalyst 116.

SUMMARY OF THE INVENTION

An aspect of the present invention is directed to an exhaust purification system for an engine, comprising a catalyst device that is interposed in an exhaust path of an engine and purifies exhaust gas of the engine by using an additive; a venturi-shaped mixing chamber that is interposed in the exhaust path to be located upstream from the catalyst device, extends from a taper portion with a diameter tapering in a downstream direction, and continues to a throttle portion with a minimum diameter and then to a flared portion with a diameter gradually increased in the downstream direction; swirl-generating means that is placed near a most upstream section of the taper portion of the mixing chamber and generates a swirling flow in the exhaust gas; and additive-injection means that is placed upstream from the throttle portion of the mixing chamber and downstream from the swirl-generating means, and injects an additive into the mixing chamber.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An exhaust purification device for an engine according to one embodiment of the present invention will be described below with reference to the attached drawings.

Figure 1:
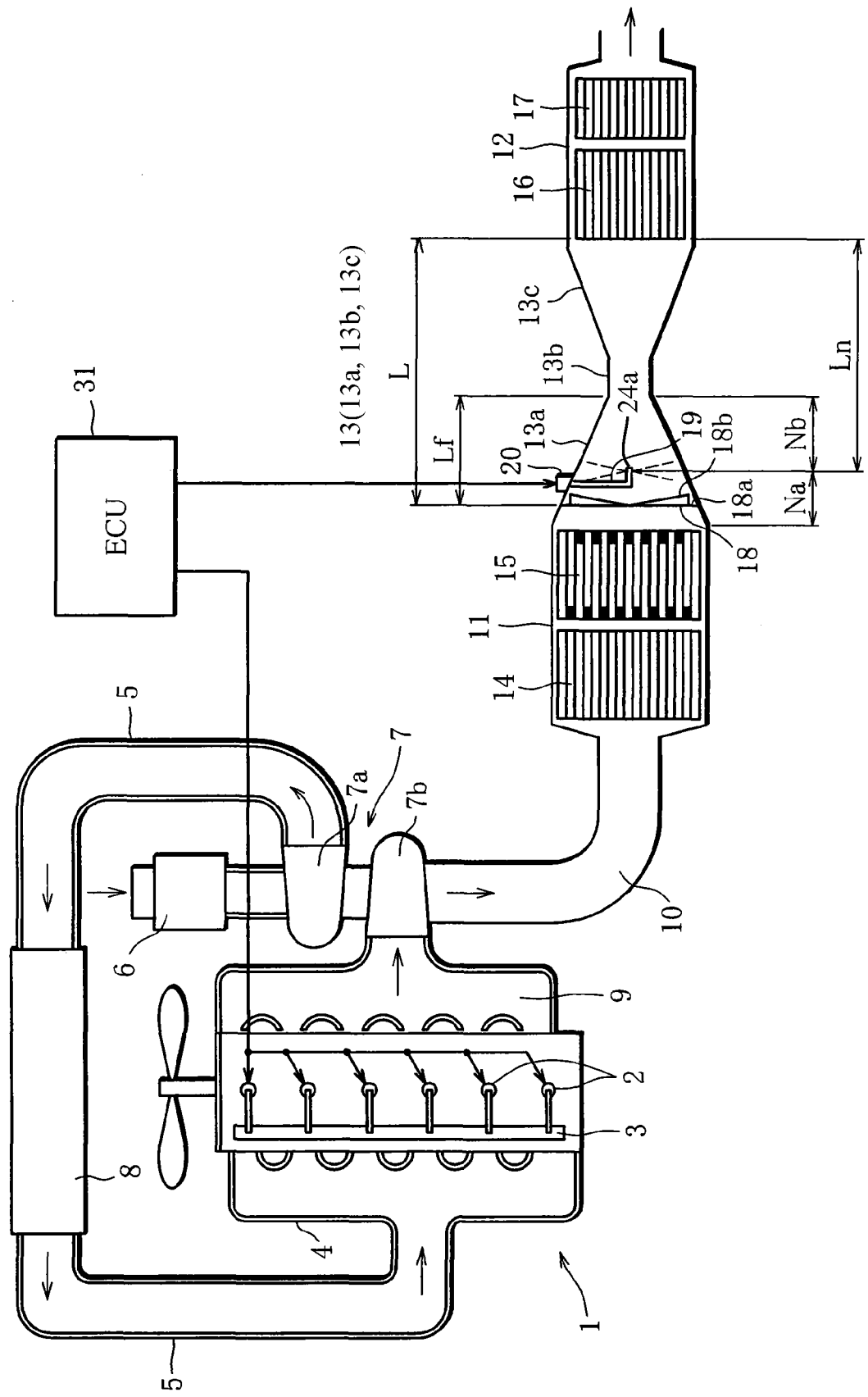
FIG. 1 is a view of the entire structure of an engine system in which an exhaust purification device according to one embodiment of the invention is installed.

FIG. 1 is a view of the entire structure of an engine system in which an exhaust purification device according to one embodiment of the present invention is installed. An engine 1 is constructed as an in-line six-cylinder diesel engine. The engine 1 has a fuel-injection valve 2 that is set in each cylinder. The fuel-injection valves 2 are supplied with pressure fuel from a common rail 3 that is shared by all the fuel-injection valves 2, and are opened with timing suitable for an operation state of the engine 1, to thereby inject fuel into their respective cylinders.

An intake manifold 4 for supplying intake air to the engine 1 is mounted on an intake side of the engine 1. In an intake path 5 connected to the intake manifold 4, there are interposed an air cleaner 6, a compressor 7a of a turbocharger 7, and an intercooler 8 in the order named from the upstream side. An exhaust manifold 9 for discharging the exhaust gas of the engine 1 is mounted on an exhaust side of the engine 1. An exhaust pipe 10 is connected to an outlet of the exhaust manifold 9 through a turbine 7b of a turbocharger 7 that is coaxially and mechanically coupled to the compressor 7a.

After being introduced into the intake path 5 through the air cleaner 6 during the operation of the engine 1, the intake air is pressurized by the compressor 7a of the turbocharger 7. The pressurized intake air is distributed to the cylinders through the intercooler 8 and the intake manifold 4 and is introduced into the cylinders during intake strokes of the cylinders. In each cylinder, fuel is injected from the fuel injection valve 2 with given timing, and the fuel ignites to burn at around a compression top dead center. The exhaust gas produced by fuel combustion passes through the exhaust manifold 9 and rotates the turbine 7b. The exhaust gas then flows through the exhaust pipe 10 to be discharged outside.

An exhaust purification device for purifying exhaust gas is interposed in the exhaust pipe 10. The exhaust purification device is made of an upstream casing 11, a downstream casing 12, and a mixing chamber 13 formed in between the casings 11 and 12. Accordingly, in addition to the exhaust pipe 10, the exhaust path is formed of the upstream casing 11, the mixing chamber 13, and the downstream casing 12.

The upstream casing 11 accommodates a pre-stage oxidation catalyst 14 and a DPF (diesel particulate filter) 15 in the order named from the upstream side. The downstream casing 12 accommodates an SCR catalyst (that is a selective reduction-type NOx catalyst and corresponds to a catalyst device of the present invention) 16 and a post-stage oxidation catalyst 17 to be located in the order named from the upstream side.

The mixing chamber 13 as a whole has a shape like a venturi with a diameter reduced in a middle portion as viewed in an exhaust-gas flowing direction. The mixing chamber 13 is made of a taper portion 13a that extends from a downstream end of the upstream casing 11 while tapering downstream, a constricted portion 13b that extends from the taper portion 13a in the downstream direction while maintaining a minimum diameter of the taper portion 13a, and a flared portion 13c that extends from the constricted portion 13b in the downstream direction in a flared shape and is connected to an upstream end of the downstream casing 12.

As is apparent from FIG. 1, the upstream casing 11, the downstream casing 12 and the mixing chamber 13 together form a shape that gradually changes in section in the exhaust-gas flowing direction. In other words, according to the present embodiment, the casings 11 and 12 and the mixing chamber 13 are integrally molded by drawing or the like. For this reason, there is no flange portion for connecting the upstream casing 11 to the mixing chamber 13 and connecting the mixing chamber 13 to the downstream casing 12, which is required if the casings 11 and 12 and the mixing chamber 13 are produced as separate parts. Accordingly, all these members are constructed to continue to one another.

A fin device 18 (swirl-generating means) is situated in a most upstream position in the taper portion 13a of the mixing chamber 13. Although a detailed explanation will be omitted, the fin device 18 has a circular steel base plate 18a that is press-molded so that a number of fins 18b are in an upright position away from the base plate 18a and arranged in a radial pattern. Through holes are formed through the base plate 18a correspondingly to the fins 18b. In the fin device 18, the exhaust gas from the DPF 15 flows through the through holes. A flowing direction of the exhaust gas is changed by the fins 18b immediately after the exhaust gas passes through the through holes. This generates a swirling flow of exhaust gas in the downstream side of the fin device 18. Disposed in the downstream side of the fin device 18 of the taper portion 13a is an injection nozzle 19 (additive-injection means) for injecting urea aqueous solution as an additive. The injection nozzle 19 extends from an outer circumference of the taper portion 13a toward the center thereof. The injection nozzle 19 has a tip end 24a that is directed toward the exhaust downstream in the center of the taper portion 13a.

The injection nozzle 19 is supplied with a urea aqueous solution having given pressure from a urea tank (not shown) through an electromagnetic valve 20 that is set in an outer circumference of the mixing chamber 13. The urea aqueous solution is injected from an injection hole, not shown, which is formed through the tip end of the injection nozzle 19, toward the outer circumference of the mixing chamber 13 in a radial pattern according to opening/closing of the electromagnetic valve 20.

The fuel injection valve 2 and the electromagnetic valve 20 of the injection nozzle 19 are electrically connected to an ECU 31 (electrical control unit). Other than these valves, various sensors and devices are also electrically connected to the ECU 31. For example, ECU 31 sets a fuel injection amount by using a map, not shown, according to engine speed Ne and accelerator depression amount θacc, and also sets fuel injection timing by using a map, not shown, according to the engine speed Ne and the fuel injection amount. The ECU 31 operates the engine 1 by driving and controlling the fuel injection valve 2 according to the fuel injection amount and the fuel injection timing. The ECU 31 determines a target injection amount of the urea aqueous solution according to exhaust temperature that is detected by a temperature sensor, not shown, which is situated in the mixing chamber 13, in order to supply ammonia ($NH_3$) to the SCR catalyst 16 so that the SCR catalyst 16 can perform reduction of NOx to purify the exhaust gas. The ECU 31 drives and controls the electromagnetic valve 20 according to the target injection amount of the urea aqueous solution and makes the injection nozzle 19 inject the urea aqueous solution.

During the operation of the engine 1, the exhaust gas discharged from the engine 1 is introduced through the exhaust manifold 9 and the exhaust pipe 10 into the upstream casing 11. Within the upstream casing 11, when the exhaust gas flows through the DPF 15 after passing through the pre-stage oxidation catalyst 14, PM (particulate matters) contained in the exhaust gas are trapped in the DPF 15.

The exhaust gas is then introduced into the mixing chamber 13, and a swirling flow of the exhaust gas is generated by the fin device 18. In a process where the swirling flow passes through the taper portion 18b toward the constricted portion 13b, the swirling flow is gradually reduced in swirl radius and increased in swirling velocity at the same time. In the subsequent process where the exhaust gas flows through the flared portion 13c, the swirling flow of exhaust gas reaches the SCR catalyst 16 located downstream while being increased in swirl radius by degree. Once the urea aqueous solution is injected from the injection nozzle 19 into the swirling exhaust gas, the urea aqueous solution is mixed with the exhaust gas to be diffused and atomized in the process of flowing through the mixing chamber 13. At this point, the urea aqueous solution is hydrolyzed by exhaust heat and vapor within the exhaust gas, which produces ammonia. The produced ammonia is used as a reducing agent to reduce NOx contained in the exhaust gas into harmless $N_2$ (nitrogen) in the SCR catalyst 16, to thereby purify the exhaust gas. The ammonia not consumed in the SCR catalyst 16 in the above process is treated by the post-stage oxidation catalyst 17.

The mixture of the urea aqueous solution with the exhaust gas and the diffusion/atomization in the exhaust gas are greatly affected by flowing condition of the exhaust gas and the urea aqueous solution within the mixing chamber 13, which in turn are greatly affected by a shape of the mixing chamber 13, and the configuration of the fin device 18 and the injection nozzle 19 within the mixing chamber 13. For this reason, in the present embodiment, the shape of the mixing chamber 13 and the configuration of constituents are determined as described below.

For the sake of convenience of explanation, path lengths between the constituents within the mixing chamber 13 are defined as follows: The path length between the base plate 18a of the fin device 18 and the upstream end of the SCR catalyst 16 is total distance L; the path length between the base plate 18a of the fin device 18 and the constricted portion 13b of the mixing chamber 13 is mixture distance Lf; and the path length between the injection hole of the injection nozzle 19 and the upstream end of the SCR catalyst 16 is diffusion distance Ln. Total path length of the mixing chamber 13 includes upstream distance Na corresponding to a portion upstream from the injection nozzle 19 of the taper portion 13a of the mixing chamber 13, and downstream distance Nb corresponding to a portion downstream from the injection nozzle 19 of the taper portion 13a.

Figure 2:
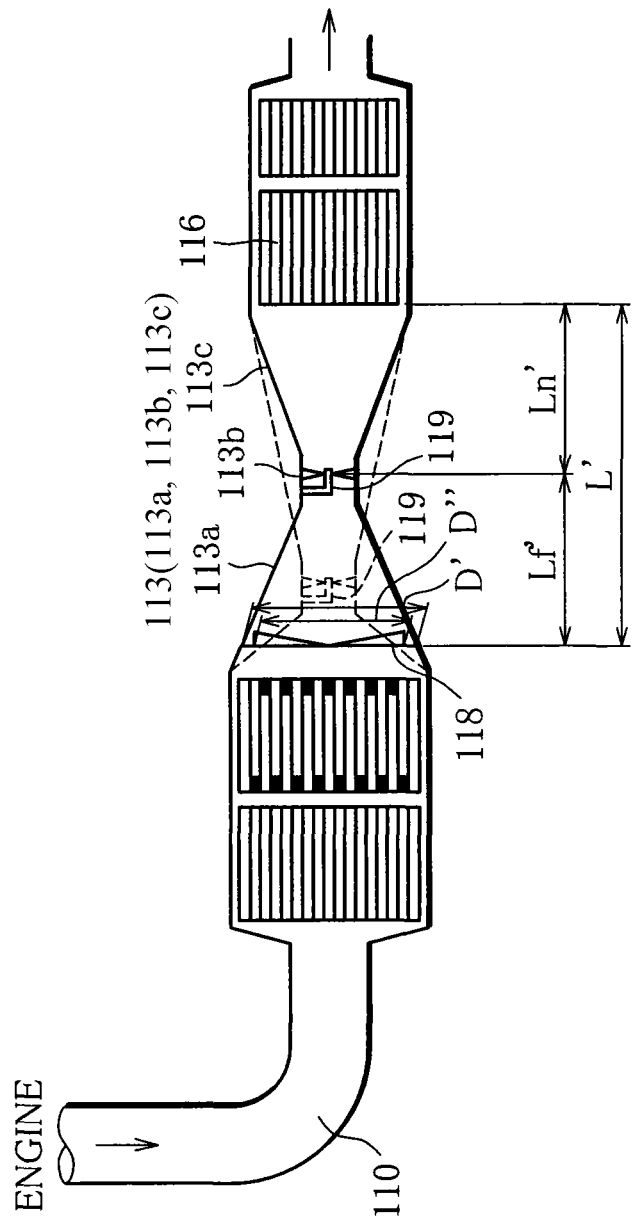
FIG. 2 is a view of the entire structure of an exhaust purification device according to Prior Art.

According to the above-mentioned exhaust purification device of Prior Art, in light of the knowledge that a first priority for achieving the good mixture of an additive with exhaust gas and the satisfactory diffusion and atomization of the additive is to inject the additive at a position where an exhaust flow rate is high, an injection nozzle 119 is situated in a constricted portion 113b of a mixing chamber 113 where the exhaust flow rate becomes maximum as illustrated in FIG. 2. However, if there is constraint on distance L due to the configuration of an exhaust pipe 110 and the like, the configuration shown in Prior Art causes insufficiency in distance Lf' between a fin device 118 and the constricted portion 113b of the mixing chamber 113 or in distance Ln' between the injection nozzle 119 and an SCR catalyst 116. In this view, the inventors of the present invention have come to a conclusion that it is more important to set the distances Lf and Ln at optimum values than to inject the additive at the position where the exhaust flow rate is high in terms of overall exhaust purification performance.

In the present embodiment, therefore, the constricted portion 13b of the mixing chamber 13 and the injection nozzle 19 are disposed in most suitable positions independently from each other rather than in association with each other, as is apparent from FIG. 1. To be more specific, the mixture distance Lf that is the path length from the fin device 18 to the constricted portion 13b of the mixing chamber 13 is set sufficiently long to prevent a loss of kinetic energy when the swirl radius of the swirling flow is reduced in the taper portion 13a of the mixing chamber 13. Needless to say, the flared portion 13c requires some path length, too. At the same time, the total distance L between the fin device 18 and the SCR catalyst 16 is constrained by the configuration of the constituents, and the like. The mixture distance Lf is therefore determined in consideration of these conditions.

Nevertheless, the mixture distance Lf is not constrained by the position of the injection nozzle 19 unlike the distance Lf' of Prior Art illustrated in FIG. 2, and is therefore set relatively long. In result, the loss of kinetic energy of the exhaust gas within the taper portion 13a is suppressed to minimum. Consequently, the swirling velocity of the swirling flow is sufficiently increased at the time point when the exhaust gas reaches the constricted portion 13b, and the urea aqueous solution injected from the injection nozzle 19 is well mixed with the exhaust gas. The present embodiment differs from Prior Art in that the urea aqueous solution is injected in the upstream side of the constricted portion 13b. This condition is not only desirable for the diffusion and atomization of the urea aqueous solution, which will be described below, but also preferable for the mixture of the exhaust gas and the urea aqueous solution. Since the exhaust gas and the urea aqueous solution start being mixed with each other at an earlier stage, the mixture is more facilitated.

The diffusion distance Ln between the injection nozzle 19 and the SCR catalyst 16 is set sufficiently long to secure time required for the injected urea aqueous solution to be uniformly diffused and atomized in the exhaust gas. Needless to say, it is necessary to prevent an interference between the injection nozzle 19 and the fin device 18. Considering this, the injection nozzle 19 is placed as upstream as possible. Consequently, in the present embodiment, the injection nozzle 19 is situated in a position upstream from a middle point between the most upstream position and a most downstream position of the taper portion 13a, that is, a position that satisfies the relationship: upstream distance Na<downstream distance Nb.

Nevertheless, the diffusion distance Ln is not constrained by the position of the constricted portion 13b unlike the distance Ln' of Prior Art illustrated in FIG. 2, and is therefore set relatively long. In result, the urea aqueous solution injected from the injection nozzle 19 is satisfactorily diffused and atomized in the exhaust gas in the process of passing through the taper portion 13a, the constricted portion 13b and the flared portion 13c of the mixing chamber 13 to reach the SCR catalyst 16.

The exhaust purification device of the present embodiment makes it possible to achieve both the good mixture of the urea aqueous solution with the exhaust gas and the satisfactory diffusion and atomization of the urea aqueous solution in the exhaust gas, which have not been simultaneously achieved by Prior Art. Therefore, the ammonia produced from the urea aqueous solution is satisfactorily diffused and supplied to the SCR catalyst 16. Consequently, the SCR catalyst 16 can offer the maximum exhaust purification performance by reducing NOx.

According to Prior Art, if the constricted portion 113b is disposed upstream side in the mixing chamber 113, the swirling velocity of the swirling flow cannot be sufficiently increased, and moreover, there causes a problem that the fin device 118 is constrained in its diameter. Concretely speaking, if the constricted portion 113b is situated upstream side of the mixing chamber 113 with the injection nozzle 119 as shown by broken lines in FIG. 2, the taper portion 113a has to be sharply reduced in diameter. The taper portion 113a is accordingly reduced in its internal diameter from D' to D" at the installation position of the fin device 118, which makes the fin device 118 small in diameter. This deteriorates the performance of the fin device 118. Such a factor also incurs a decrease in swirling velocity of the swirling flow, that is, the insufficient mixture of the exhaust gas and the urea aqueous solution.

The present embodiment does not require that the constricted portion 13b be situated upstream side in the mixing chamber 13 with the injection nozzle 19 to begin with. The embodiment therefore has an advantage of preventing the above-described problem of Prior Art attributable to the decrease of the diameter of the fin device 118.

In addition, since the present embodiment integrally forms the casings 11 and 12 and the mixing chamber 13 through drawing or the like, the exhaust purification device is not provided with flange portions for connecting these members. If the connecting flange portions are provided to the casings 11 and 12, the mixing chamber 13 and the like, costs will be raised. Furthermore, there occurs the problem that the hydrolysis of the urea aqueous solution is not facilitated due to heat release from the flange portions and the problem that the possibility of a leakage of exhaust gas containing the urea aqueous solution, and the like, is increased. The present embodiment, however, is capable of preventing these problems by the integral forming of the casings 11 and 12 and the mixing chamber 13.

This is the end of descriptions about the embodiment, but the aspect of the invention is not limited to the embodiment. For instance, the invention in the embodiment is embodied as the exhaust purification device having the SCR catalyst 16 that serves as a catalyst device for exhaust purification. However, the exhaust purification device is not limited to the foregoing. On the contrary, the invention can be applied to any exhaust purification device for an engine as long as the device has a catalyst device that requires the supply of an additive.

For example, it is possible to apply the invention to an exhaust purification device for an engine, in which an adsorption-type NOx catalyst that adsorbs NOx contained in exhaust gas is interposed in an exhaust path. This exhaust purification device requires a regular NOx purge that injects fuel into the exhaust path as an additive in order to discharge the adsorbed NOx from the NOx catalyst to reduce the NOx. In this case, the device has a structure in which the SCR catalyst 16 in FIG. 1 is replaced with an adsorption-type NOx catalyst, and fuel, instead of the urea aqueous solution, is injected from the injection nozzle 19. Such an exhaust purification device can also provide similar operation and advantages to those of the embodiment if the configuration of the constituents within the mixing chamber 13 is arranged in the same fashion as in the embodiment.

Although the embodiment uses an in-line six-cylinder diesel engine as the engine 1, the engine 1 is not limited in the number of cylinders and engine type.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust purification device for an engine, the exhaust purification device comprising:
   a catalyst device interposed in an exhaust path of an engine for purifying exhaust gas of the engine with an additive;
   a venturi-shaped mixing chamber interposed in the exhaust path upstream from the catalyst device and having a taper portion, a constricted portion, and a flared portion, the taper portion tapering down in size in a downstream direction to an upstream end of the constricted portion, which has a minimum diameter, and the flared portion gradually tapering up in the downstream direction from a downstream end of the constricted portion;
   a swirl-generating device disposed in the taper portion of the mixing chamber at a most upstream part of the taper portion of the mixing chamber for generating a swirling flow in the exhaust gas; and
   an additive-injection nozzle disposed upstream from the constricted portion of the mixing chamber and downstream from the swirl-generating device for injecting a urea aqueous solution into the mixing chamber as the additive for making NOx contained in the exhaust gas harmless,
   wherein the additive-injection nozzle is entirely and exclusively disposed upstream of a middle point between an upstream end and a downstream end of the taper portion, and has a tip end that extends along a center of the taper portion toward the downstream end of the taper portion.

2. The exhaust purification device for an engine according to claim 1, wherein the catalyst device is a selective reduction-type NOx catalyst that selectively reduces NOx contained in exhaust gas with ammonia contained in the urea aqueous solution as a reducing agent.

3. The exhaust purification device for an engine according to claim 1, wherein the additive-injection nozzle has a tip end that extends into the chamber and is configured to inject the urea aqueous solution from a center of the mixing chamber.

4. The exhaust purification device for an engine according to claim 3, wherein the tip end extends axially along the center of the mixing chamber and injects the urea aqueous solution radially outwardly from the center of the mixing chamber.

* * * * *